US007624219B2

(12) United States Patent
Fuessl et al.

(10) Patent No.: US 7,624,219 B2
(45) Date of Patent: Nov. 24, 2009

(54) BUS NODE

(75) Inventors: Bernd Fuessl, Eriskirch (DE); Thomas Riehm, Constance (DE); Peter Schoepe, Weingarten (DE)

(73) Assignee: IFM Electronic GmbH, Essen (DE)

( * ) Notice: Subject to any disclaimer, the term of this patent is extended or adjusted under 35 U.S.C. 154(b) by 128 days.

(21) Appl. No.: 11/891,492

(22) Filed: Aug. 9, 2007

(65) Prior Publication Data

US 2009/0043939 A1 Feb. 12, 2009

(51) Int. Cl.
*G06F 13/14* (2006.01)
*G05B 9/02* (2006.01)

(52) U.S. Cl. ............................ 710/305; 710/33; 700/79

(58) Field of Classification Search ................... 710/33, 710/34, 61, 71, 305, 307, 316; 713/1; 700/1-7, 700/78, 79

See application file for complete search history.

(56) References Cited

U.S. PATENT DOCUMENTS 6,446,202 B1 * 9/2002 Krivoshein et al. ............. 713/1
6,851,067 B2 * 2/2005 Indefrey et al. ............. 713/324
2002/0108077 A1 * 8/2002 Havekost et al. .............. 714/47
2004/0008467 A1 * 1/2004 Calandre et al. ............ 361/119
2004/0024495 A1 * 2/2004 Sunderland ................. 700/299
2005/0228509 A1 * 10/2005 James .......................... 700/19
2006/0053218 A1 * 3/2006 Thoren ....................... 709/224
2007/0076863 A1 * 4/2007 Schiffmann et al. ........... 380/28

OTHER PUBLICATIONS

ASI4U Universal Actuator-Sensor Interface IC, Rev. 1.01, ZMD AG, Aug. 2005.*

* cited by examiner

*Primary Examiner*—Khanh Dang
(74) *Attorney, Agent, or Firm*—Elliott N. Kramsky

(57) ABSTRACT

The present invention relates to an apparatus for connection to a communication bus, in particular an apparatus for encoding the status of several emergency devices for communication across an AS-interface. A data code indicative of a collective state of one or more subsets of the emergency devices is communicated during cyclic communication from the slave to the master whereas information indicative of the individual states of the emergency devices is communicated during acyclic communication from the slave to the master.

24 Claims, 1 Drawing Sheet

10
20
100
AS-i +
strobe
code generator
codebit 3
codebit 2
codebit 1
codebit 0
30A ... H
Vcc
50A
50B
50C
50D
AS-i Interface IC
DIN 0
DIN 1
Data input
DIN 2
DIN 3
Parameter input
P0
P1
P2
P3
AS-i –
Vcc
40A ... D

BUS NODE

CROSS-REFERENCE TO RELATED APPLICATIONS

This application is a non-provisional application claiming no benefit of an earlier filed application.

STATEMENT OF GOVERNMENT INTEREST

The subject matter of this application was not carried out under contract with the government of the United States.

BACKGROUND OF THE INVENTION

1. Field of the Invention

The present invention relates to an apparatus for connection to a communication bus. More specifically, it relates to an apparatus for encoding the status of several emergency switches for communication across a so-called AS-interface.

2. Description of the Related Art

The Aktuator-Sensor-Interface, typically referred to as an AS-interface or AS-i, is a two-wire master-slave bus system as described in "AS-Interface, The Automation Solution" published 2002 by the AS-International Association, Zum Taubengarten 52, 63571 Gelnhausen, Germany, the full content of which is hereby incorporated by reference. The AS-interface has been standardized in European standard EN 50295, the full content of which is hereby incorporated by reference. An alternative version of the AS-interface has been standardized in IEC Standard 62026-2, the full content of which is hereby incorporated by reference. Bus systems compliant with any of the aforementioned references may be termed an AS-interface.

The two wires of an AS-interface are used for data communication and power supply. An AS-interface has a single master node (hereinafter also just "master") and a plurality of slave nodes node (hereinafter also just "slave"). The master queries each of the slaves individually. In other words, only the queried slave responds. The master queries each of the slaves sequentially. In other words, the master queries each of the slaves, one after the other, in accordance with a predetermined sequence. Such a sequential querying of all slaves is designated as a cycle. Once all slaves have been sequentially queried by the master, the cycle is repeated. Between any two cycles, the master may exchange data with any one of the slaves. The master queries the slaves in accordance with a predetermined timing.

In the context of an AS-interface, the exchange of data between the master and a slave during a cycle is termed cyclic communication, and the exchange of data between the master and a slave between any two cycles is termed acyclic communication. Hereinafter, data communicated in an AS-interface by cyclic communication are referred to as data codes, and data communicated in an AS-interface by acyclic communication are referred to as parameters or parameter codes.

The AS-interface specification includes so-called "Safety at Work" provisions that allow both safety information and normal data to be communicated across the same AS-i cable. For example, the emergency wiring of a machine can be integrated into the control wiring of that machine without significant additional overhead, yet while complying with the requirements of Safety Integrity Level 3 (SIL3) of IEC standard 61508 and Category 4 of European standard EN 954-1.

To ensure secure querying of safety-relevant slaves that are connected to safety components such as emergency buttons and that supply corresponding safety signals, the (querying/request) data packets that are sent from the master to safety-relevant slaves as well as the (response) data packets that are sent from a safety-relevant slave to the master during cyclic communication include special bit patterns that are several bits in length. Specifically, a secure slave, i.e. a slave compliant with the AS-i "Safety at Work" provisions, codes safety relevant information, e.g. the information "emergency button not activated," into a 32-bit long codeword, four respective bits of which are communicated per cycle over a consecutive sequence of eight cycles.

The use of 32-bit codewords theoretically allows for over four billion, namely $2^{32}$, different codewords. However, the AS-i specification includes rules that restrict the available codewords to roughly 950,000 possibilities. The available codewords are centrally administered and individually issued to ensure that each secure AS-i slave is globally uniquely identifiable based on the "fingerprint" of its codeword(s).

In accordance with the AS-i "Safety at Work" provisions, a safety monitor monitors the data communicated between the master and any secure slaves during cyclic communication. If the safety monitor detects a codeword from a secure slave that, instead of the expected codeword, contains a zeroed bit pair at the beginning and/or the end of the four bits communicated in a respective cycle, the safety monitor activates the safety state associated with the respective secure slave. In the case of a secure slave that transmits information indicative of the state of an emergency button on a machine, for example, divergence from the expected codeword indicating that the emergency button has not been activated could trigger the safety monitor to cut off all power to that machine and to perhaps activate an emergency braking mechanism for that machine.

In practice, it is often desired to install safety-relevant devices, e.g. emergency buttons, door contact switches, etc., at various positions in an installation. Conventionally, networking these safety-relevant devices via an AS-interface requires a corresponding number of secure slaves, which is impractical. Alternatively, the safety-relevant devices can be connected in series. In latter case, however, when one of the serially connected, safety-relevant devices is activated, the safety monitor receives no information specifying which of the serially connected, safety-relevant devices has been activated. While this lack of specific information may be irrelevant for many safety aspects of an installation, e.g. for ensuring that the appropriate machine or that the overall installation is shut down, it is generally desirable to obtain such information e.g. for guiding firefighting or rescue crews or for allowing the "fault" to be pinpointed and remedied by maintenance personnel.

Similar problems can arise when networking numerous devices via other, i.e. non-AS-i, bus systems or when networking numerous non-safety-critical devices via an AS-interface.

It is an object of the present invention to overcome these deficiencies of the prior art.

BRIEF SUMMARY OF THE INVENTION

In a broad aspect, the invention can be seen in an apparatus for coding a plurality of substantially binary input signals and for outputting the coded signals as bus signals for communication on a bus, i.e. as a bus node circuit. Similarly, the invention can be seen in method comprising the steps of coding a plurality of substantially binary input signals and outputting the coded signals as bus signals for communication on a bus.

In an embodiment of the invention, a first bus signal is output that is representative of a collective state of two or more of the plurality of substantially binary input signals and a second bus signal is output that is representative of an individual state of each of said substantially binary input signals. For example, if each of the plurality of substantially binary input signals is indicative of whether a respective emergency switch has been activated, the first bus signal can be representative of whether any of the emergency switches has been activated, and the second bus signal can be representative of the individual activation states of the emergency switches. In an AS-interface, the first bus signal can be communicated during cyclic communication between the master and a secure slave, i.e. as a data code (signal) in the form of the predefined codeword associated with the secure slave or an appropriately zeroed (as described above) variant thereof, and the second bus signal can be communicated during acyclic communication between the master and a secure slave, i.e. as a parameter code (signal) that is independent of the predefined codeword associated with the secure slave.

In an embodiment of the invention, at least two bits of the data code (signal) are representative of a collective state of two or more of the plurality of substantially binary input signals. To improve upon the reliability of the data codes, the state of the at least two bits can be determined by independent means, e.g. by identical, yet redundant means. In this fashion, the requirements of European standard EN 954 can be fulfilled.

In an embodiment of the invention, a series circuit is employed to process the two or more substantially binary input signals to generate a signal that is representative of the collective state of the two or more substantially binary input signals. Such a series circuit is simple to manufacture, low in cost, yet reliable. The series circuit can be simply and cost-effectively implemented by a chain of serially connected switching devices.

In an embodiment of the invention, the inputs of the apparatus that receive the plurality of substantially binary input signals are electrically insulated from the outputs of the apparatus that output the bus signals. This ensures that the bus is not disturbed by extraneous signals. This electrical insulation can be achieved by optocouplers, digital magnetic isolators, relays or other electrically insulating signal transmission devices/electrically insulating switching devices situated e.g. between the inputs and the bus interface circuitry of the apparatus. If employed in the aforementioned series circuit, electrically insulating switching devices can simultaneously fulfill two functions within the apparatus.

In an embodiment of the invention as a slave node circuit for encoding the status of several emergency devices for communication across an AS-interface, a data code indicative of a collective state of one or more subsets of the emergency devices is communicated during cyclic communication from the slave to the master whereas information indicative of the individual states of the emergency devices is communicated during acyclic communication from the slave to the master.

While the present description may, for the sake of brevity, limit itself to a description of the invention as an apparatus, the teachings of this specification are to be understood as applying equally to a method capable of effecting the functionality of the described apparatus, i.e. a method comprising steps that effect the results of the apparatus.

BRIEF DESCRIPTION OF THE DRAWINGS

The novel features of the invention, as well as the invention itself, both as to its structure and its operation will be best understood from the accompanying FIGURE, taken in conjunction with the accompanying description. The FIGURE shows.

DETAILED DESCRIPTION OF THE INVENTION

Figure 1:
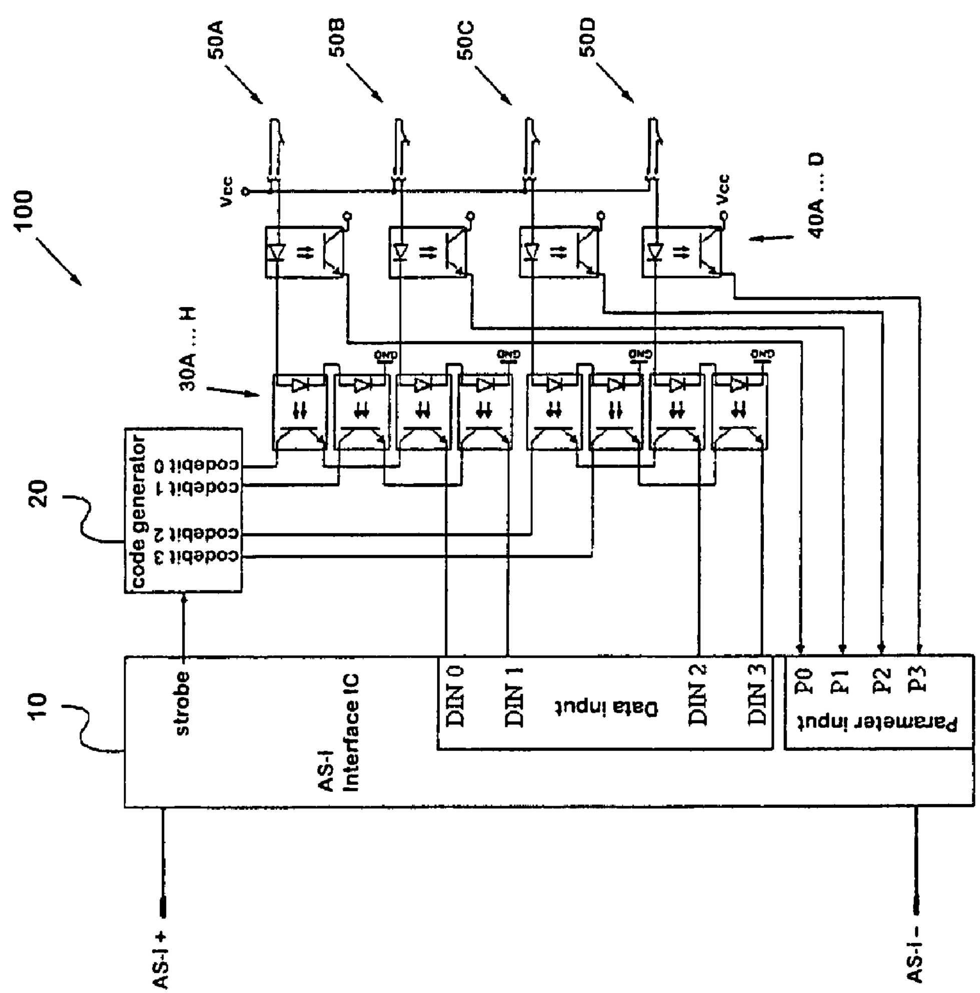
FIG. 1 a bus node circuit in accordance with an embodiment of the invention.

FIG. 1 schematically illustrates a bus node circuit 100 in accordance with an embodiment of the invention. The illustrated bus node circuit 100 constitutes a secure server node of an AS-interface. Bus node circuit 100 includes an AS-i interface IC 10, a code generator 20, optocouplers 30A to 30H, optocouplers 40A to 40D. The bus node circuit 100 is connected to emergency switches 50A to 50D.

Code generator 20 serves to generate the 32-bit codeword associated with the bus node circuit four bits at a time (codebit 0 to codebit 3) as described supra.

The illustrated strobe signal of AS-i interface IC 10 serves to trigger generation and output of the next four-bit sub-code of the 32-bit codeword from code generator 20. Various implementations for codeword generator 20 are well known in the art. For example, code generator 20 can be implemented by a microprocessor as described in paragraph [0004] of German laid-open application DE 10 20 009 A1. The teaching thereof can be paraphrased as teaching that, to generate and provide the bit pattern, the slave comprises, in addition to the interface, a further, external circuit, typically in the form of a microprocessor, that includes memory means (e.g. solid state memory) for providing the multi-bit information constituting the (sub-)codeword(s), a counter that points at a location in memory, a timing device synched to the timing of communication on the AS-i bus, a plurality of output channels corresponding in number to the number of bits of the information (e.g. sub-codeword) to be provided, as well as an input impulse detector for triggering the timing device during valid AS-i communication, wherein a program for controlling operation is provided in a storage area of the microprocessor.

The bus node circuit 100 is configured such that an input terminal of optocoupler 40A is connected to a power supply Vcc via emergency switch 50A and that the other input terminal of optocoupler 40A is connected to ground via the light emitting diodes (LED's) of optocouplers 30A and 30B. Accordingly, the respective LED's of optocouplers 40A, 30A and 30B emit light when emergency switch 50A is closed (inactivated) and emit no light when emergency switch 50A is open (activated). Optocouplers 40B, 30C and 30D are similarly connected to emergency switch 50B. Optocouplers 40C, 30E and 30F are similarly connected to emergency switch 50C. Optocouplers 40D, 30G and 30H are similarly connected to emergency switch 50D.

The bus node circuit 100 is configured such that the collector of the phototransistor that constitutes an output terminal of optocoupler 40A is connected to a power supply Vcc. The emitter of the phototransistor that constitutes an output terminal of optocoupler 40A is connected to parameter input terminal P0 of AS-i interface IC 10. Accordingly, when emergency switch 50A is closed, the phototransistor of optocoupler 40A receives light from the input LED of optocoupler 40A, and parameter input terminal P0 of AS-i interface IC 10 is connected to power supply Vcc, i.e. is held at a binary "1" level. When emergency switch 50A is activated, the phototransistor of optocoupler 40A receives no light, and parameter input terminal P0 of AS-i interface IC 10 is disconnected from power supply Vcc, i.e. falls to a binary zero level. Parameter input terminals P1, P2 and P3 respectively interact with optocouplers 40B, 40C and 40D and emergency switches 50B, 50C and 50D in a similar fashion.

The bus node circuit 100 is configured such that the collector of the phototransistor that constitutes an output terminal of optocoupler 30A is connected to a "codebit 0" output terminal of code generator 20. The emitter of the phototransistor that constitutes an output terminal of optocoupler 30A is connected to the collector of the phototransistor that constitutes an output terminal of optocoupler 30C, and the emitter of the phototransistor that constitutes an output terminal of optocoupler 30C is connected to data input terminal "DIN 0" of AS-i interface IC 10. Optocouplers 30A and 30C thus constitute a series circuit, the output of which depends, by virtue of the connection of optocouplers 30A and 30C to emergency switches 50A and 50B, respectively, on the state of optocouplers 30A and 30C. Specifically, when both emergency switch 50A and emergency switch 50B are closed, the phototransistor of optocoupler 30A receives light from the input LED of optocoupler 30A due to the closure of emergency switch 50A, the phototransistor of optocoupler 30C receives light from the input LED of optocoupler 30C due to the closure of emergency switch 50B, and, as a result, data input terminal "DIN 0" of AS-i interface IC 10 is connected to the "codebit 0" output terminal of code generator 20. When either (or both) of emergency switches 50A or 50B is/are activated, the phototransistor of optocoupler 30A/30C, as the case may be, receives no light, and data input terminal "DIN o" of AS-i interface IC 10 is disconnected from the "codebit 0" output terminal of code generator 20, i.e. falls to a binary zero level. The output of optocouplers 30B and 30D to data input terminal "DIN 1" of AS-i interface IC 10 similarly depends on the state of emergency switches 50A and 50B as well as codebit 1 of code generator 20. The output of optocouplers 30E and 30G to data input terminal "DIN 2" of AS-i interface IC 10 similarly depends on the state of emergency switches 50C and 50D as well as codebit 2 of code generator 20. The output of optocouplers 30F and 30H to data input terminal "DIN 3" of AS-i interface IC 10 similarly depends on the state of emergency switches 50C and 50D as well as codebit 3 of code generator 20.

Although the inputs of optocouplers 30A, 30C, 30E and 30 G are shown as being respectively connected in series with optocouplers 40A to 40D to emergency switches 50A to 50D, the inputs of optocouplers 30A, 30C, 30E and 30 G could be directly connected to emergency switches 50A to 50D, e.g. could be connected in parallel with the inputs of optocouplers 40A to 40D to emergency switches 50A to 50D.

AS-i interface IC 10 interfaces the signals received via data inputs "DIN 0" to "DIN 3" and parameter inputs P0 to P3 in an AS-i-compliant manner to an AS-interface, i.e. to the two signal lines of an AS-i-compliant bus, via the two bus signal outputs AS-i− and AS-i+. Specifically, the signals, i.e. binary signal levels, received via data inputs "DIN 0" to "DIN 3" are interfaced to be communicated as the four bits communicated from the secure slave to the master per cycle. Similarly, the signals, i.e. binary signal levels, received via parameter inputs P0 to P3 are interfaced to be acyclically communicated from the secure slave to the master as binary parameter codes between cycles.

As is apparent from the above description of the bus node circuit and its function, activation of any of emergency switches 50A to 50D will result in communication of a codeword from the secure slave that, instead of the correct codeword generated by the code generator 20, contains a zeroed bit pair at the beginning and/or the end, as the case may be, of the four bits communicated in a respective cycle. This "fault" or "emergency" condition will be recognized by the safety monitor that will then activate the appropriate safety state, i.e. the safety state associated with the secure slave whose codeword contained the zeroed bits. Later, in one or more rounds of acyclic communication, the safety monitor and/or the master will receive parameter codes based on the input signals received at parameter input terminals P0 to P3 that specify the emergency switch or similar safety device whose activation triggered to the "fault" or "emergency" condition. In this respect, it is important to note that recognition of a "fault" or "emergency" condition by the safety monitor does not ordinarily lead to termination of communication over the AS-interface.

As stated above, the illustrated strobe signal of AS-i interface IC 10 serves to trigger generation and output of the next four-bit sub-code of the 32-bit codeword from code generator 20. Any circuit that interfaces data input signals and parameter input signals to a bus network, e.g. provides the interface functionality described in this specification, can be used as AS-i interface IC 10. For example, the integrated circuit commercially available under the designation "ASI4UC-G1-ST" from ZMD America Inc., 201 Old Country Road, Ste 204, Melville, N.Y. 11747 can be employed as AS-i interface IC 10.

In the illustrated embodiment, the outputs of two safety devices are processed in series via respective pairs of optocouplers 30A to 30H. This principle can be extended to a larger number of safety devices. In other words, the outputs of three or more safety devices can be processed in series to influence the signal provided to any of data input terminals "DIN 0" to "DIN 3." In general, the signal output to any of data input terminals "DIN 0" to "DIN 3" is indicative of a collective state of a subset of the safety devices connected to the bus node circuitry. For example, the signal output to any of data input terminals "DIN 0" to "DIN 3" can be indicative of a deviation of the state any of the subset of the safety devices connected to the bus node circuitry from an expected state of the respective safety device. To specify the specific safety device that triggered the "fault" or "emergency" condition, the interface circuitry can include a larger number of parameter input terminals that receive a signal from a respective one of the safety devices, and/or alternative circuitry can be used that uniquely codes the identity of the specific safety device that triggered the "fault" or emergency condition to a number of bits that is smaller than the number of safety devices connected to the bus node circuitry. Such circuitry for uniquely coding the identity of a single signal having a value that differs from a plurality of other signals is known in the art.

In the illustrated embodiment, optocouplers are used as switching elements and for electrical insulation of the inputs of the bus node circuitry from the outputs of the bus node circuitry. However, digital magnetic isolators, relays or other electrically insulating signal transmission devices/electrically insulating switching devices can be likewise used in the present invention, e.g. in lieu of the optocouplers or at appropriate locations as known to the person skilled in the art in alternative circuit configurations of the present invention. Similarly, conventional switching devices can be combined with electrically insulating signal transmission devices/electrically insulating switching devices to provide the optional electrical insulation in addition to the desired coding and interface functionality of the present invention.

The use of independent circuitry, based on the outputs of the same subset of safety devices connected to the bus node circuitry, to zero a bit pair at the beginning and/or the end, as the case may be, of the four bits communicated in a respective cycle increases the reliability of signals communicated by the bus node as compared to a zeroing of a single bit of the four bits or the use of non-independent circuitry. Nonetheless, this circuitry need not zero bit pairs and need not be independently implemented. Any circuitry that outputs one or more signals indicative of a "fault" or "emergency" condition in one or more predetermined subsets of the safety devices connected to the bus node circuitry can be used in place of illustrated circuit configuration of optocouplers 30A to 30H.

Although a secure slave node for an AS-interface is illustrated and described, the present invention is equally applicable to any type of bus node circuitry for any type of bus system. In the present specification, data communicated in an AS-interface by cyclic communication are referred to as data codes, and data communicated in an AS-interface by acyclic communication are referred to as parameters or parameter codes. However, since the present invention is applicable to bus systems other than AS-interfaces, the terms data code, parameter and parameter code as used in the present specification are not to be interpreted per se as limiting to within the aforementioned contextual definition of these terms. Instead, the term data code is to be understood in the general sense of information that is consistently communicated at a time, in a manner and/or in a form that is distinct from the time, manner or form at/in which other information, which other information is designated by the term parameter or parameter code, is communicated in the bus environment for which the respective bus node circuitry has been conceived. Of the two distinct times, manners and/or forms of communication, data codes designate information that is communicated at a time, in a manner and/or in a form that is more reliable and/or faster and/or at briefer intervals than the information designated as parameters or parameter codes in the relevant bus environment.

Further information with regard to the terminology used in this specification as well as techniques and hardware employable for implementing the known features of the invention can be found in the aforementioned documents incorporated into the present specification by reference.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of the invention, even those disclosed solely in combination with other features of the invention, may be combined in any configuration excepting those readily apparent to the person skilled in the art as nonsensical. Likewise, use of the singular and plural is solely for the sake of illustration and is not to be interpreted as limiting. Except where the contrary is explicitly noted, the plural may be replaced by the singular and vice-versa.

The invention claimed is:

1. A bus node circuit comprising:

a coding circuit that receives a plurality of substantially binary input signals and outputs a first output signal and a plurality of other output signals; and a bus interface circuit having a first data input terminal and a plurality of parameter input terminals, said first data input terminal being connected to said coding circuit to receive said first output signal, and each of said plurality of parameter input terminals being connected to said coding circuit to receive a respective one of said plurality of other output signals, wherein said plurality of substantially binary input signals comprises a first predetermined subset comprising at least two substantially binary input signals, said first output signal having a first binary state if each substantially binary input signal of said first predetermined subset exhibits a respectively predetermined binary state, each of said plurality of other output signals has a binary state indicative of a binary state of a respective one of said substantially binary input signals, said bus interface circuit outputs a plurality of bus signals compliant with European standard EN 50295 or IEC Standard 62026-2, said plurality of bus signals including a data code representative of said first output signal and a parameter code representative of said plurality of other output signals.

2. The bus node of claim 1, wherein said coding circuit receives a first input signal, and said first output signal is equal to said first input signal if a substantially binary input signal belonging to said first predetermined subset exhibits a binary state that differs from said respectively predetermined binary state.

3. The bus node circuit of claim 1, wherein said bus interface circuit has a plurality of bus connection terminals that are each connectable to a respective signal line of a bus, and said bus interface circuit outputs said plurality of bus signals via said plurality of bus connection terminals.

4. The bus node circuit of claim 3, wherein said bus interface circuit outputs said data code in response to a cyclic request from a master node of said bus and outputs said parameter code in response to an acyclic request from said master node.

5. The bus node of claim 1, wherein said coding circuit outputs a second output signal that is distinct from said first output signal and said plurality of other output signals, said bus interface circuit has a second data input terminal, said second output signal has a second binary state if each substantially binary input signal belonging to said first predetermined subset exhibits a respectively predetermined binary state, and said second data input terminal is connected to said coding circuit to receive said second output signal.

6. The bus node circuit of claim 5, wherein said coding circuit comprises a first coding sub-circuit that generates said first output signal and a second coding sub-circuit, independent from said first coding sub-circuit, that generates said second output signal.

7. The bus node of claim 5, wherein said coding circuit receives a second input signal, and said second output signal is equal to said second input signal if a substantially binary input signal belonging to said first predetermined subset exhibits a binary state that differs from said respectively predetermined binary state.

8. The bus node circuit of claim 5, wherein said bus interface circuit has a plurality of bus connection terminals that are each connectable to a respective signal line of a bus, said bus interface circuit outputs, via said plurality of bus connection terminals, a data code representative of said first and second input signals and a parameter code representative of said plurality of other output signals.

9. The bus node circuit of claim 8, wherein said bus interface circuit outputs said data code in response to a cyclic request from a master node of said bus and outputs said parameter code in response to an acyclic request from said master node.

10. The bus node circuit of claim 6, wherein said coding circuit outputs a third and a fourth output signal, both of which are distinct from said first output signal, said second output signal and said plurality of other output signals, said bus interface circuit has a third and a fourth data input terminal, said plurality of substantially binary input signals comprises a second predetermined subset comprising at least two substantially binary input signals, said second predetermined subset differing from said first predetermined subset, said third output signal having a third binary state if each substantially binary input signal of said second predetermined subset exhibits a respectively predetermined binary state, said fourth output signal has a fourth binary state if each substantially binary input signal belonging to said second predetermined subset exhibits a respectively predetermined binary state, said third data input terminal is connected to said coding circuit to receive said third output signal, said fourth data input terminal is connected to said coding circuit to receive said fourth output signal, and said coding circuit comprises a third coding sub-circuit that generates said third output signal and a fourth coding sub-circuit, independent from said third coding sub-circuit, that generates said fourth output signal.

11. The bus node circuit of claim 1, wherein said coding circuit is configured and adapted to receive said plurality of substantially binary input signals in parallel, and each of said plurality of other output signals is uniquely associated with a respective one of said plurality of substantially binary input signals, each of said plurality of other output signals having a binary state indicative of a binary state of said respective, uniquely associated one of said substantially binary input signals.

12. A bus node for connection to a bus, comprising:

a coding and interface circuit that receives a plurality of substantially binary input signals and outputs a plurality of bus signals compliant with European standard EN 50295 or IEC Standard 62026-2, said bus signals including a data code signal and a parameter code signal, wherein said data code signal is representative of a collective state of two or more of said substantially binary input signals, and said parameter code signal is representative of an individual state of each of said substantially binary input signals.

13. The bus node of claim 12, wherein said coding and interface circuit comprises a series circuit that processes said two or more of said substantially binary input signals to generate an output signal that is representative of said collective state.

14. The bus node of claim 13, wherein said series circuit comprises two or more serially connected switching devices, each of which switching devices has an input and an output that is electrically isolated from said input.

15. The bus node of claim 14, wherein said switching devices are selected from the group consisting of optocouplers, digital magnetic isolators and relays.

16. The bus node of claim 13, wherein said coding and interface circuit comprises a bus interface circuit that receives said output signal and generates said data code signal therefrom.

17. The bus node of claim 12, wherein said coding and interface circuit comprises a bus interface circuit and a plurality of switching devices, each of which switching devices has an input and an output that is electrically isolated from said input, said bus interface circuit receives a plurality of input signals that are respectively representative of said plurality of substantially binary input signals, said bus interface circuit receives each of said plurality of input signals via a respective one of said plurality of switching devices, and said bus interface circuit generates said parameter code signal from said plurality of input signals.

18. The bus node of claim 17, wherein each of said plurality of switching devices is selected from the group consisting of optocouplers, digital magnetic isolators and relays.

19. The bus node of claim 12, wherein said coding and interface circuit outputs said data code signal in response to a cyclic request from a master node of said bus and outputs said parameter code signal in response to an acyclic request from said master node.

20. The bus node of claim 12, wherein said data code signal comprises a first bit representative of said collective state and a second bit representative of said collective state, and said coding and interface circuit comprises a first circuit for generating said first bit and a second circuit, independent of said first circuit, for generating said second bit.

21. A system comprising:

a plurality of emergency switches, each respective one of said emergency switches configured and adapted to generate a signal indicative of an open/closed state of said respective one emergency switch;

a coding and interface circuit configured and adapted to receive said signal from each of said plurality of emergency switches and to output a plurality of bus signals compliant with European standard EN 50295 or IEC Standard 62026-2, said bus signals including a data code signal and a parameter code signal, wherein said data code signal is representative of a collective state of said plurality of emergency switches, and said parameter code signal is representative of an individual state of each of said plurality of emergency switches.

22. A method comprising the steps of:

generating, with respect to each respective one of a plurality of emergency switches, a signal indicative of an open/closed state of said respective one of said plurality of emergency switches;

receiving each said signal and outputting, based on said received signals, a plurality of bus signals compliant with European standard EN 50295 or IEC Standard 62026-2, said bus signals including a data code signal and a parameter code signal, wherein said data code signal is representative of a collective state of said plurality of emergency switches, and said parameter code signal is representative of an individual state of each of said plurality of emergency switches.

23. A bus node comprising:

a code generator that outputs at least one pair of code bits;

a coding circuit that receives said at least one pair of code bits and at least two substantially binary input signal and that outputs at least two data output signals and a plurality of parameter output signals; and a bus interface circuit connected to said coding circuit to receive a plurality of signals including said at least two data output signals and said plurality of parameter output signals and that outputs one or more bus signals based on said received plurality of signals, wherein said coding circuit has a first sub-circuit that outputs a first data output signal of said at least two data output signals based on one code bit of said at least one pair of code bits and said at least two substantially binary input signals, and said coding circuit has a second sub-circuit, distinct from said first sub-circuit, that outputs a second data output signal of said at least two data output signals based on another code bits of said at least one pair of code bits and said at least two substantially binary input signals.

24. The bus node circuit of claim 23, wherein said bus signals are compliant with European standard EN 50295 or IEC Standard 62026-2.

* * * * *